May 4, 1926.
W. G. HOUSKEEPER
METHOD OF FORMING GLASSWARE
Filed Sept. 13, 1924
1,583,464
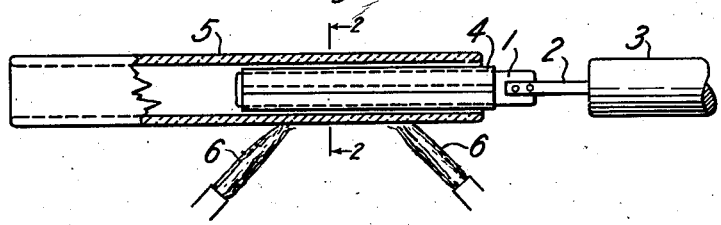
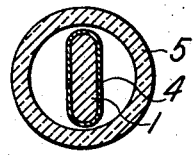 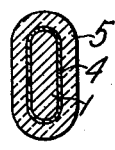 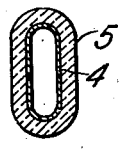
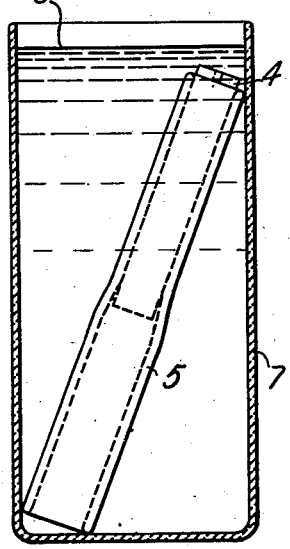
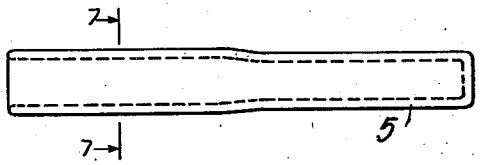
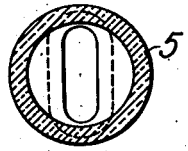
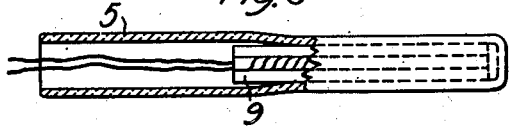
Inventor:
William G. Houskeeper
by     Atty.

Patented May 4, 1926.

1,583,464

UNITED STATES PATENT OFFICE.

WILLIAM G. HOUSKEEPER, OF SOUTH ORANGE, NEW JERSEY, ASSIGNOR TO WESTERN ELECTRIC COMPANY, INCORPORATED, OF NEW YORK, N. Y., A CORPORATION OF NEW YORK.

METHOD OF FORMING GLASSWARE.

Application filed September 13, 1924. Serial No. 737,453.

*To all whom it may concern:*

Be it known that I, WILLIAM G. HOUS-KEEPER, a citizen of the United States of America, residing at South Orange, in the county of Essex, State of New Jersey, have invented certain new and useful Improvements in Methods of Forming Glassware, of which the following is a full, clear, concise, and exact description.

This invention relates to glass working and has for an object the formation of glassware of accurate interior dimensions.

In accordance with this invention a solid metal form or core having approximately the dimensions of the interior of the passage to be obtained is provided with a closely fitting sheet of thin metal foil. A glass tube or vessel is slid over the core and foil and the glass softened and pressed into contact with the metal foil. The core is withdrawn while the glass is sufficiently viscous to retain its shape leaving the metal foil in contact with the interior surface of the glass. The glass is allowed to cool slowly and when cold the metal foil is dissolved with acid after which the glass vessel is ready for use. By this method various forms of glassware having definite interior dimensions may be produced and reproduced accurately within as close limits as may be desired.

Referring to the drawings, Fig. 1 shows the method of forming the glass vessel on the metal core; Fig. 2 is an enlarged cross-sectional view of Fig. 1 on the line 2—2. Fig. 3 illustrates a cross-sectional view after pressing the glass to the metal foil. Fig. 4 is a cross-section of the vessel with the core removed; Fig. 5 shows the glass vessel in the dissolving bath; Fig. 6 is a side view of the completed vessel; Fig. 7 is a section of Fig. 6 on the line 7—7 and Fig. 8 illustrates one application of the invention to a measuring element casing.

Referring to Fig. 1, a metallic form or core 1, which may be of iron or brass, having approximately the dimensions of the interior of the passage to be obtained, is provided with a metallic shaft 2 which carries a handle 3, to facilitate the handling of the core. A thin sheet of metal foil 4, preferably copper, surrounds the metal core 1 and is pressed into close fitting contact with the surface of the core to remove any air spaces between the foil and the core surface. The dimensions of the core and foil may be so adjusted as to produce any desired interior dimensions for the glass vessel. The metal foil may be slightly oxidized to facilitate the fusion of the metal and the glass. A glass tube 5, preferably of slightly larger interior dimensions than the metal core and foil, is slid over the core and a flame 6 applied to the exterior surface of the glass. The glass tube and core are rotated in the flame 6 to apply equal heat to the entire surface of the glass tube and when the glass is sufficiently plastic it is pressed in contact with the metal foil on the core by means of glass working pliers. While the glass is still hot, but yet sufficiently viscous to retain its shape, the metal core is withdrawn leaving the metal foil in intimate contact with the interior surface of the glass vessel. The glass is allowed to cool slowly and as it contracts the thin metal foil is forced to follow the contraction of the glass.

The glass vessel is then placed in a vessel 7 which contains a solvent 8, which completely dissolves the foil.

This method provides a glass vessel having the exact interior dimensions desired, as shown in Figs. 6 and 7.

One application of the invention is shown in Fig. 8 in which a non-corrodible casing for a recording hygrometer is provided. The non-corrodible casing 5 made in accordance with this invention is closed at the flattened end and is adapted to receive the measuring element of a platinum resistance thermometer 9 with as little clearance as may be desired between the measuring element and the inside opening of the casing.

It is apparent from the description of the method that the method is applicable to other shapes and forms and is not limited to the particular form shown and described and is limited only within the scope of the appended claims.

What is claimed is:

1. The method of forming glassware which comprises forming a core, applying a thin layer of foil to said core, pressing melted glass on said foil, removing the core, and thereafter removing the foil.

2. The method of forming glassware which comprises forming a metal core, surrounding said core with foil of uniform thickness, applying melted glass to said foil, and thereafter dissolving said foil in a solvent.

3. The method of forming glassware having exact interior dimensions which comprises forming a core, applying thin foil to said core, pressing melted glass on said foil, removing the core, and thereafter dissolving the foil.

4. The method of forming glassware having exact interior dimensions which comprises forming a core of approximately the dimensions of the passage desired, applying thin metallic foil to the surface of said core, oxidizing the metal foil, surrounding said core and foil with a glass vessel of slightly larger interior dimensions, fusing said glass by heat, pressing the fused glass in contact with said foil, slowly cooling said glass vessel, removing said core, and thereafter dissolving said metal foil in acid.

5. The method of forming glassware which comprises forming a core, applying a covering of thin metallic foil on side core, forming glass in contact with said foil and removing said core.

In witness whereof, I hereunto subscribe my name this 8 day of September A. D., 1924.

WILLIAM G. HOUSKEEPER.